June 12, 1956 R. C. MARHOLZ 2,750,494

MOUNTING VEHICLE FOR RADIO RECEIVERS

Filed Oct. 17, 1952 2 Sheets-Sheet 1

Inventor
Richard C. Marholz
By Jack M. Wiseman
Attorney

Inventor
Richard C. Marholz
By Jack M. Wiseman
Attorney

United States Patent Office 2,750,494
Patented June 12, 1956

2,750,494

MOUNTING VEHICLE FOR RADIO RECEIVERS

Richard C. Marholz, Chicago, Ill., assignor to Raytheon Manufacturing Company, a corporation of Delaware Application October 17, 1952, Serial No. 315,402

3 Claims. (Cl. 250—14)

The present invention relates in general to a radio mounting assembly and more particularly to a radio mounting assembly for vehicles.

Heretofore, in order to mount a radio receiver on a panel or on a dashboard of a vehicle, it was necessary to remove a given portion of the panel having fixed dimensions and inserting in lieu thereof a radio receiver having fixed dimensions and constructed particularly to fit the removed portion of the panel. At other times, if the radio receiver was not constructed for a particular panel, then it was necessary to provide a kit to enable the radio receiver to be mounted on a panel or the dashboard.

Accordingly, an important object of the present invention is to provide a novel radio mounting assembly that can be installed with facility by enabling any size vehicle radio receiver to be mounted on the panel of any vehicle without requiring auxiliary equipment, such as kits, or given specifications.

Another object of the present invention is to provide a radio receiver mounting assembly for a vehicle in which the panel thereof remains between the dial assembly and the chassis of the radio receiver, thereby eliminating the requirement of the removal of the portion of the panel having specifications conforming to the size of the radio receiver.

A feature of the present invention is to provide a clear plastic substance for illuminating the dial of the radio receiver which receives the light energy from a source positioned on the chassis of the radio receiver.

Other objects and features will appear upon further perusal of the detailed description taken in conjunction with the accompanying drawings in which.

Briefly described, the present invention provides a radio receiver mounting assembly for vehicles whereby it is no longer necessary to remove a portion of the panel or dashboard of a vehicle having fixed dimensions conforming to the size of a radio receiver.

This is accomplished by providing a plurality of apertures of any suitable size in a conventional panel or dashboard of a vehicle. For supporting a conventional vehicle radio receiver, detachable means, such as bushings, having threads thereon, are received by the apertures and are fixedly secured to the panel by suitable means, such as nuts. The radio receiver is secured to the bushing by suitable means, such as nuts.

An escutcheon plate of the vehicle radio receiver is positioned on one side of the panel and is secured, in the preferred embodiment, to two of the bushings or detachable members. A dial assembly is also positioned at said one side of the panel and is secured by means of a third centrally positioned bushing.

On the other side of the panel is positioned a suitable case or enclosing member of the vehicle radio receiver and is fixedly secured to the aforesaid two bushings by suitable means, such as nuts. A suitable chassis of the vehicle radio receiver is supported by and secured to the case. The third bushing for supporting the dial assembly is also secured to the chassis.

For supporting operating knobs of the radio receiver, which is positioned on said one side of the panel, a plurality of suitable shafts or rods is received by said two bushings. The shafts or rods interlink, through the panel, the operating knobs and the conventional tuning mechanism of the radio receiver, as well as the conventional volume control—on and off switch, which are positioned on the chassis of the vehicle radio receiver.

For illuminating the dial mechanism the center aperture in the panel receives a clear plastic member which may be made of suitable material, such as methyl, methacrylate, or resin acrylic. One end thereof is positioned, in the preferred embodiment, at the center of the dial mechanism. The other end thereof is extended through an aperture in the case. The clear plastic member at one end is fixedly secured to the dial assembly and at the other end the clear plastic member is secured to the bushing attached to the chassis for supporting the dial assembly. A source of light, such as the suitable light bulb, positioned on the chassis radiates a beam of light which is then received by the clear plastic member to illuminate the dial of the vehicle radio receiver.

Figure 1:
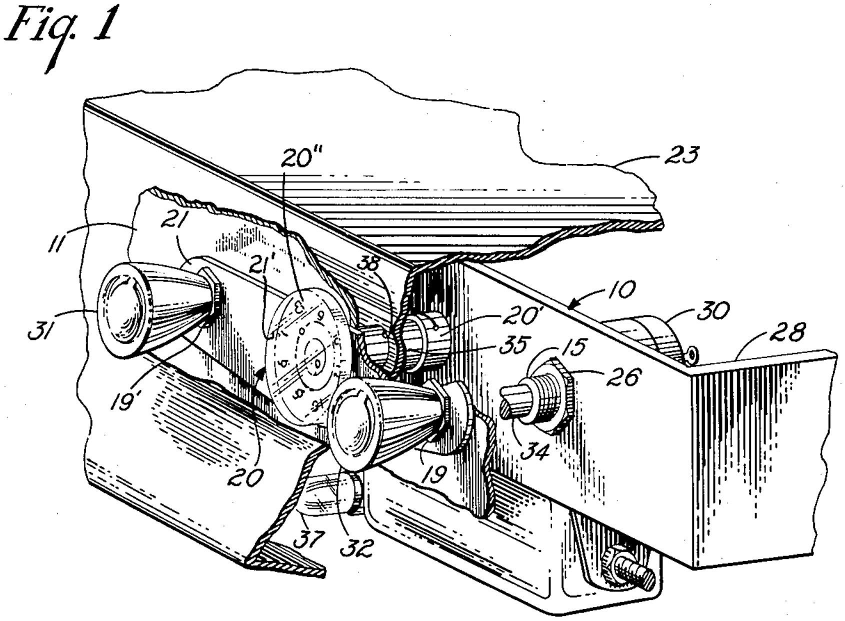
Figure 1 is a perspective view of the novel radio receiver mounting assembly for vehicles and having a cutaway portion to particularly illustrate the mounting of the dial assembly thereof.
Figure 2:
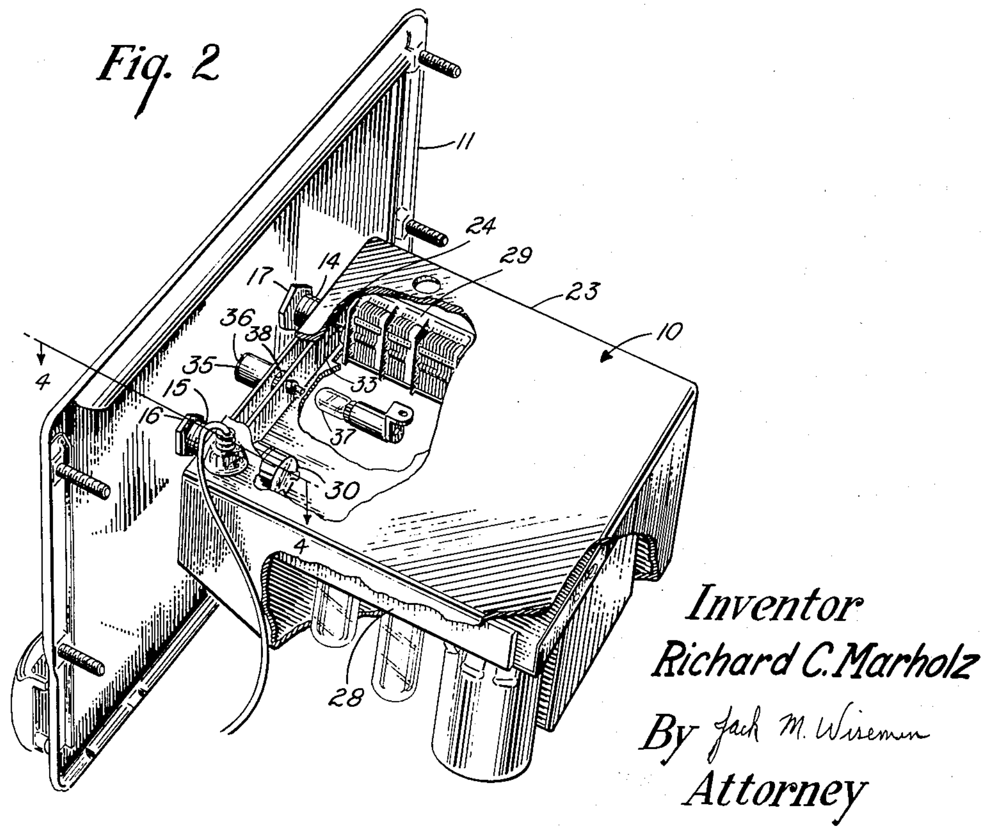
Figure 2 is a perspective view of the radio receiver mounting assembly for vehicles and particularly illustrating the mounting of the chassis.
Figure 3:
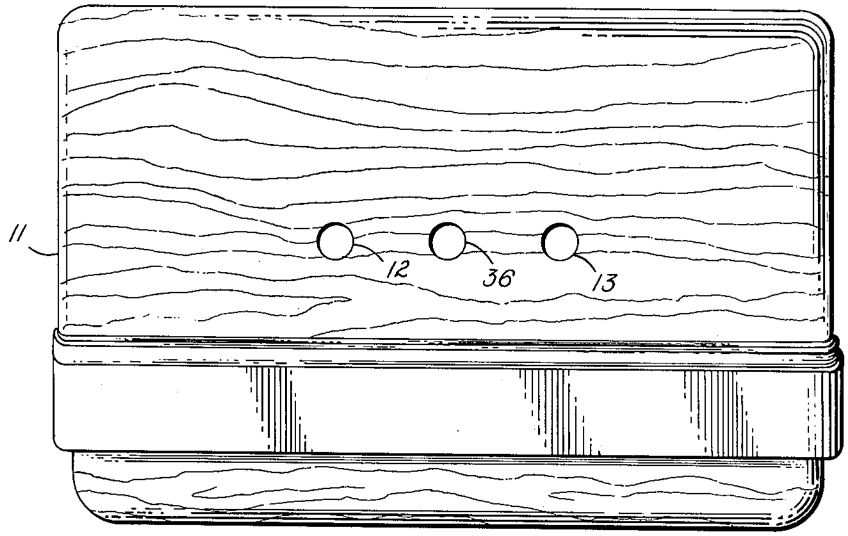
Figure 3 is a front view of a vehicle panel having apertures therein for receiving the connecting shafts and bushings of the vehicle radio receiver mounting assembly.
Figure 4:
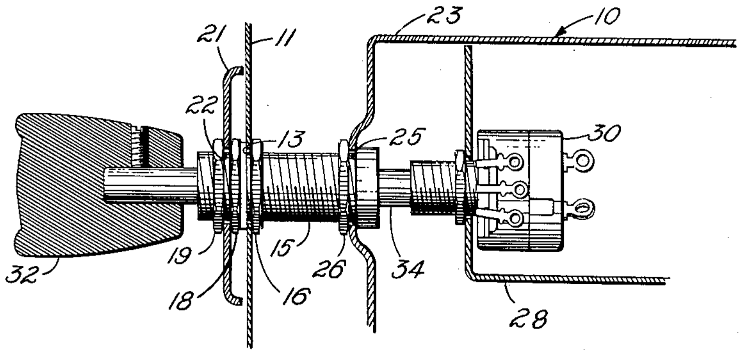
Figure 4 is a sectional view taken substantially along the line 4, 4 of Figure 2 for particularly illustrating the mounting assembly.

Referring now to Figures 1 through 4, inclusive, a conventional radio receiver 10 is herein provided adaptable for use in a vehicle. For supporting the radio receiver 10, a supporting member, such as a conventional panel 11 or a dashboard of a vehicle is provided. In order to mount the radio receiver 10 to the panel 11, suitable apertures 12 and 13 are provided in the panel 11. For securing the radio receiver 10 to the panel 11, detachable members having threads thereon, such as bushings 14 and 15, are received by the apertures 12 and 13. The bushings 14 and 15 are fixedly secured to the panel by suitable means, such as nuts 16, 17, and 18.

On one side of the panel 11 is positioned a suitable dial mechanism 20 of the radio receiver 10. The dial mechanism comprises a dial face or dial indicator 20''. For supporting the dial mechanism 20, suitable means, such as bushing 20', is provided. An escutcheon plate 21, which is positioned on said one side of panel 11, is provided and has suitable apertures 22 therein so as to receive the bushings 14 and 15. The escutcheon plate 21 is secured to the bushings 14 and 15 in a suitable manner by the nuts 18, 19 and 19'. The escutcheon plate 21 has therein a well 21' which receives the dial indicator 20''. The contour of the escutcheon well 21' conforms to the contour of the dial face 20''. Accordingly, the escutcheon plate 21 encompasses the dial indicator 20''.

On the other side of the panel 11 is positioned a suitable case 23 or an enclosing member for the radio receiver 10. For supporting the case 23, apertures 24 and 25 are provided in case 23 for receiving the bushings 14 and 15. The case is fixedly secured to the bushings 14 and 15 by suitable means, such as nuts 26.

A suitable chassis 28 is supported by and secured to the case 23 in a conventional manner, such as a screw and nut arrangement. The chassis 28 has secured thereto the bushing 20', which supports the dial assembly 20. The chassis 28 has positioned thereon a conventional tuning mechanism 29 and a conventional volume control—on and off mechanism 30. For operating the tuning mechanism 29 in order to select a station and to control the volume—on and off mechanism 30, suitable control knobs 31 and 32 are positioned on said one side.

For interlinking the control knobs 31 and 32 the tuning mechanism 29 and the volume control mechanism 30, respectively, shafts or rods 33 and 34 are provided.

The shaft 33 is received by the bushing 14, aperture 12 of the panel 11, aperture 22 of the escutcheon plate 21, and aperture 24 of the case 23. One end of the shaft 33 has attached thereto a control knob 31 and the other end thereof is attached to the tuning mechanism 29. The shaft 33 is mechanically connected to the dial mechanism 20 in a conventional manner to operate an indicator.

The shaft 34, which is similar in mechanical linkage and structure as shaft 33, is received by the bushing 15, aperture 13 of the panel 11, aperture 23 of the escutcheon plate 21, and aperture 25 of the case 23. One end of the shaft 34 has attached thereto a control knob 22 and the other end thereof is attached to the volume control—on and off mechanism 30.

It is to be noted that the panel 11 separates and is positioned between the dial mechanism 20 and the chassis 28 of the radio receiver 10.

For illuminating the dial indicator 20" of the radio receiver 10, a clear plastic member 35 is herein provided made of suitable material, such as methyl, methacrylate, or resin acrylic. One end of the clear plastic member 35 is fixedly secured and positioned at the center of the dial indicator 20" and extends through a suitable aperture 36 in the panel 11. The other end of the clear plastic member 35 extends into the chassis 28 through a suitable aperture 38 in the case 23, and is secured to the chassis 28 by means of the bushing 20' for supporting the dial assembly 20.

A suitable source of light energy on the chassis 23, such as bulb 37, provides a glow of light which is received by the clear plastic member 35 and passes therethrough to illuminate the dial 20.

In operation, the apertures 12, 13, and 36 are bored into the panel 11. Thereupon, the operator places the case 23, which contains the chassis 28, on said other side of the panel 11. The bushings 14 and 15 are aligned with the apertures 12 and 13 and placed therethrough. The necessary nuts are adjusted to secure the case 23 to the panel 11.

Noteworthy is the manner of mounting the dial assembly 20. The dial assembly 20 as a unit, having the clear plastic member 35 fixedly attached thereto, is placed in position from said one side of the panel 11. The clear plastic member 35 passes through the aperture 36, through the aperture 38 and into the bushing 20', which acts as a sleeve and secures the dial assembly 20 thereto. Subsequently the escutcheon plate 21 is secured to the bushings 14 and 15. The control knobs 21 and 22 are then secured to the shafts 33 and 34, respectively. The advantage gained thereby is that the dial face need not conform to the contour of a cut-out portion in the panel.

It is to be understood that variations and modifications may be effected without departing from the scope of the appended claims.

I claim:

1. In a vehicle radio receiver mounting assembly, a radio receiver, a vehicle supporting member for supporting said radio receiver and having apertures therein, detachable membes received by certain of said apertures and secured to said supporting member, an escutcheon plate positioned on one side of said supporting member and having a well therein, a dial indicator positioned in said well on said one side of said supporting member, a tubular elongated transparent member extending backward from said dial indicator through said supporting member and having one end secured to said dial indicator, means securing said escutcheon plate to said detachable members, a case for said radio receiver having operative radio components therein and positioned on the other side of said supporting member, means securing the other end of said transparent member to said case, and means for securing said case to said detachable member enabling said supporting member to be positioned between said escutcheon plate and said dial indicator on said one side and said case on said other side.

2. In a vehicle radio receiver assembly, a radio receiver, a vehicle panel for supporting said radio receiver and having apertures therein, bushings received by certain of said apertures and secured to said panel, an escutcheon plate for said radio receiver positioned on one side of said panel having a well therein, means securing said escutcheon to said bushings, a dial indicator positioned in said well on said one side of said supporting member, a tubular elongated transparent member extending backward from said dial indicator through said supporting member and having one end secured to said dial indicator an enclosing member for said radio receiver positioned on the other side of said panel, means securing said enclosing member to said bushings, a chassis for said radio receiver supported by said enclosing member, means securing the other end of said transparent member to said chassis, a tuning mechanism on said chassis for selecting a radio signal, a switching mechanism on said chassis for controlling the operation of said radio receiver, a first shaft received by one of said bushings and operatively connected to said tuning mechanism, a second shaft received by another of said bushings and operatively connected to said switching mechanism, a first operating knob positioned on said one side of said panel and secured to said first shaft for controlling the operation of said tuning mechanism, and a second operating knob positioned on said one side of said panel and secured to said second shaft for controlling the operation of said switching mechanism.

3. In a vehicle radio receiver mounting assembly, a radio receiver, a vehicle supporting member for supporting said radio receiver and having apertures therein, detachable members received by certain of said apertures and secured to said supporting member, a chassis for said radio receiver positioned on one side of said supporting member, means securing said chassis to said detachable members, an escutcheon plate for said radio receiver positioned on the other side of said supporting member and having a well therein, means securing said escutcheon plate to said detachable members, a dial assembly for said radio receiver positioned on said other side of said supporting member, a dial face in said dial assembly received by said well, a clear plastic member extending backward from said dial assembly through said supporting member and having one end secured to said dial assembly and received by another of said apertures, means securing the other end of said transparent member to said chassis, and a source of light on said chassis radiating a beam of light for said clear plastic member and providing illumination of said dial face through said clear plastic member.

References Cited in the file of this patent

UNITED STATES PATENTS

| | | |
|---|---|---|
| 1,905,539 | White | Apr. 25, 1933 |
| 1,918,160 | White | July 11, 1933 |
| 2,053,941 | Booth | Sept. 8, 1936 |
| 2,077,284 | TePas | Apr. 13, 1937 |
| 2,208,512 | Hirt | July 16, 1940 |
| 2,358,352 | Sherwood | Sept. 19, 1944 |